(12) United States Patent
Yasuda et al.

(10) Patent No.: US 7,995,875 B2
(45) Date of Patent: Aug. 9, 2011

(54) MIRROR-EMBEDDED OPTICAL WAVEGUIDE AND FABRICATION METHOD OF SAME

(75) Inventors: Hiroki Yasuda, Mito (JP); Koki Hirano, Hitachinaka (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 12/131,984

(22) Filed: Jun. 3, 2008

(65) Prior Publication Data
US 2009/0046978 A1 Feb. 19, 2009

(30) Foreign Application Priority Data
Jun. 6, 2007 (JP) ................................ 2007-150466

(51) Int. Cl.
G02B 6/12 (2006.01)
G02B 6/26 (2006.01)
G02B 6/30 (2006.01)
G02B 6/42 (2006.01)

(52) U.S. Cl. ................. 385/14; 385/31; 385/38; 385/49

(58) Field of Classification Search ...................... 385/14
See application file for complete search history.

(56) References Cited

U.S. PATENT DOCUMENTS

| | | | | |
|---|---|---|---|---|
| 4,378,143 | A * | 3/1983 | Winzer | 385/44 |
| 5,177,859 | A * | 1/1993 | Froning et al. | 29/600 |
| 5,894,538 | A * | 4/1999 | Presby | 385/129 |
| 5,999,670 | A | 12/1999 | Yoshimura et al. | |
| 6,913,705 | B2 * | 7/2005 | Nakata | 216/24 |
| 6,952,504 | B2 * | 10/2005 | Bi et al. | 385/9 |
| 7,202,007 | B2 * | 4/2007 | Shibata et al. | 430/199 |
| 2001/0035083 | A1 * | 11/2001 | Fasanella et al. | 83/881 |
| 2002/0039475 | A1 * | 4/2002 | Furuyama | 385/129 |
| 2002/0051599 | A1 * | 5/2002 | Tsukamoto et al. | 385/14 |
| 2004/0234224 | A1 * | 11/2004 | Ishizaki et al. | 385/129 |
| 2005/0041906 | A1 * | 2/2005 | Sugama et al. | 385/14 |
| 2005/0117833 | A1 * | 6/2005 | Fukuzawa et al. | 385/14 |
| 2008/0170822 | A1 * | 7/2008 | Bae et al. | 385/18 |

FOREIGN PATENT DOCUMENTS
JP 10-300961 11/1998
* cited by examiner

Primary Examiner — Rhonda S Peace
(74) Attorney, Agent, or Firm — Antonelli, Terry, Stout & Kraus, LLP.

(57) ABSTRACT

A mirror embedded optical waveguide according to the present invention comprises: a core; an angled cut face in the core; an adhesive layer on the angled cut face, the adhesive layer having approximately the same refractive index as that of the core; and a metal film on the adhesive layer, the metal film being formed by transfer.

3 Claims, 2 Drawing Sheets

MIRROR-EMBEDDED OPTICAL WAVEGUIDE AND FABRICATION METHOD OF SAME

CLAIM OF PRIORITY

The present application claims priority from Japanese patent application serial no. 2007-150466 filed on Jun. 6, 2007, the content of which is hereby incorporated by reference into this application.

BACKGROUND OF THE INVENTION

1. Field of the Invention

The present invention relates to mirror-embedded optical waveguides and fabrication methods thereof, which offer excellent characteristics in terms of cost, mass production and reliability.

2. Description of Related Art

With recent development of information and communication technology typified by the Internet as well as dramatic increase in processor speeds, there has been growing demand for high volume data transmission such as image and motion video. In such high volume data transmissions, there is demand for transmission rates of 10 Gbps or more as well as small effect of electromagnetic noise. Among such high-speed communications, optical transmissions, which are not affected by electromagnetic noise, have shown great promise. In this context, conventionally employed electrical transmissions using metal cables and wiring are being replaced by optical transmissions using optical fibers and waveguides.

Mainly for reducing mounting cost in such optical transmission systems, there have been proposed an optical waveguide which mounts therein a photonic device (such as a surface light emitting device and surface light receiving device) in parallel to its core as shown in FIG. 4. FIG. 4 is a schematic illustration showing a cross-sectional view of a conventional optical waveguide having a photonic device mounted thereon.

In this technology, the optical path needs to be deflected approximately 90° in order to optically couple the core and photonic device. A means for realizing this is to form a V-groove in the core by dicing or the like and to fabricate a mirror on an angled surface of the V-groove. For example, such a mirror is provided by reflection at the bare angled surface formed in the waveguide and, in this case, its reflectivity is determined from the refractive index difference between air and the waveguide (core) material. Another method of forming such a mirror is to form a metal film on the angled surface by vapor depositing a metal such as gold (e.g., see JP-A Hei 10 (1998)-300961).

However, the mirror utilizing the bare surface cut by dicing or the like has a surface roughness (projections and depressions), and therefore has a problem of increased light reflection loss (mirror loss) due to degraded reflection efficiency.

On the other hand, the mirror provided by the metal-deposited surface has a cost problem because the number of waveguides loadable in a vapor deposition chamber becomes limited with increasing size of the waveguide. Also, it requires some form of mask for masking undesired portions. Such use of a mask presents problems of increased cost and resolution limitation. Furthermore, a vapor-deposited metal film generally has a poor adhesiveness to an optical waveguide material, thus posing a problem of peeling. When light is incident on and reflected by the metal film, an adhesive layer such as $TiO_2$ can be sandwiched between the metal film and optical waveguide material in order to improve the adhesiveness therebetween. However, when light is incident on and reflected by the core-side (waveguide-side) surface of such an above-described mirror of an optical waveguide, the light passes through such a $TiO_2$ adhesive layer, thus causing a problem of reduced reflectivity.

SUMMARY OF THE INVENTION

Under these circumstances, it is an objective of the present invention to solve the above problems and to provide a mirror-embedded optical waveguide with excellent optical characteristics and reliability. Furthermore, it is another objective of the present invention to provide a fabrication method thereof, which offers advantages in terms of cost and mass production.

(1) According to one aspect of the present invention, there is provided a mirror embedded optical waveguide which includes: a core; an angled cut face in the core; an adhesive layer formed on the angled cut face and having approximately the same refractive index as that of the core; and a metal film formed on the adhesive layer by transfer.

(2) According to another aspect of the present invention, there is provided a fabrication method for a mirror embedded optical waveguide having a core, an angled cut face in the core and a metal film on the angled cut face, which includes steps of: vapor depositing a metal onto a metal-film-transferring-jig; applying, to the angled cut face, an adhesive having approximately the same refractive index as that of the core; and, in order to form a metal film, transferring the metal onto the angled cut face by forcing the metal formed on the metal-film-transferring-jig against the adhesive-applied angled cut face.

In the above aspect (2) of the present invention, the following modifications and changes can be made.

(i) The optical waveguide has an overclad and the angled cut face is provided by forming a mirror groove extending from the overclad through the core; the step of applying the adhesive includes dropping the adhesive onto the mirror groove; and the metal-film-transferring-jig is formed in a shape fittable into the mirror groove, and the transferring step further includes steps of: fitting the metal-film-transferring-jig into the mirror groove; curing the adhesive; and removing the metal-film-transferring-jig from the mirror groove.

(ii) The optical waveguide is a polymer optical waveguide.

(iii) The metal-film-transferring-jig has an average surface roughness, Ra, of 0.05 μm or less.

(iv) The optical waveguide has an underclad and the angled cut face is provided by forming a mirror groove extending from the core into the underclad.

(3) According to another aspect of the present invention, there is provided a fabrication method for a mirror embedded optical waveguide having a core, an overclad, an angled cut face in the core and a metal film on the angled cut face, which includes steps of: forming a metal-film-transferring-jig having, on its surface, a release layer of a release agent; vapor depositing a metal onto the release layer; providing the angled cut face by forming a mirror groove extending from the overclad through the core; applying, to the angled cut face, an adhesive having approximately the same refractive index as that of the core by dropping the adhesive in the mirror groove; fitting the metal-film-transferring-jig into the mirror groove; and transferring the metal onto the angled cut face in order to form a metal film thereon, in which the transferring step includes steps of: forcing the metal-deposited metal-film-transferring-jig against the adhesive-applied angled cut face;

curing the adhesive; and removing the metal-film-transferring-jig from the mirror groove.

ADVANTAGES OF THE INVENTION

The present invention exhibits excellent advantages as follows.

(1) It offers a mirror-embedded optical waveguide having excellent optical characteristics and reliability.

(2) It offers a fabrication method for a mirror-embedded optical waveguide having advantages in terms of cost and mass production.

DETAILED DESCRIPTION OF THE PREFERRED EMBODIMENTS

An preferred embodiment according to the present invention will be described below with reference to the accompanying drawings. However, the present invention is not limited to the embodiment described herein.

Figure 1:
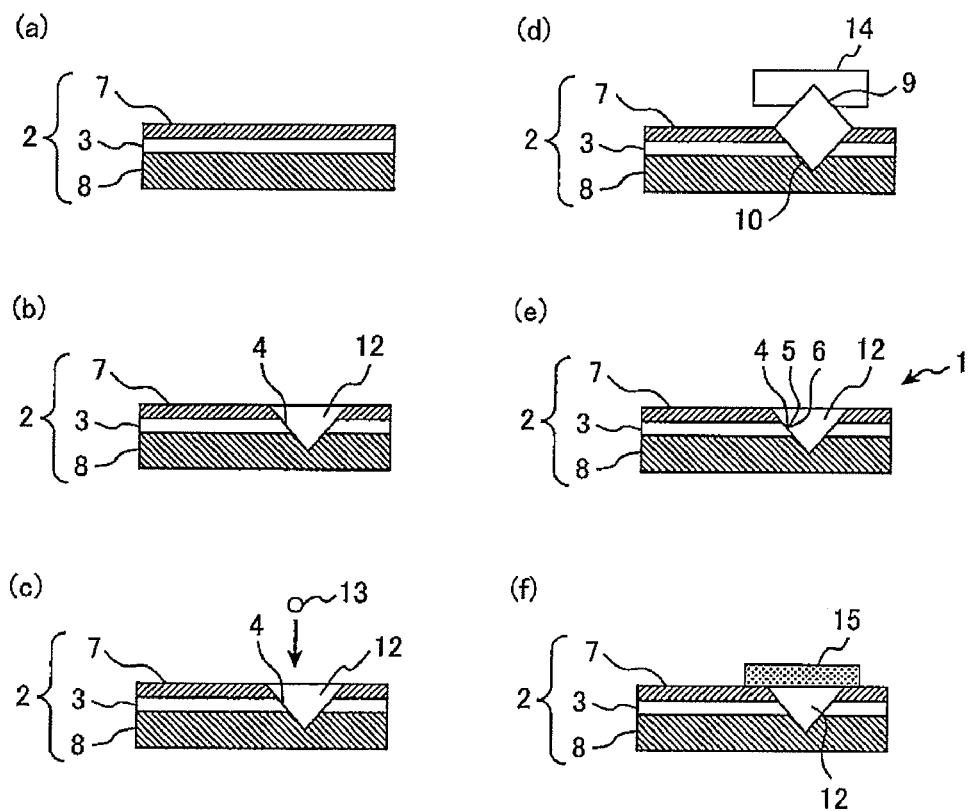
FIGS. 1(a) to 1(f) are schematic illustrations showing cross-sectional views of fabrication steps for a mirror embedded optical waveguide according to the present invention.

A mirror-embedded-optical-waveguide 1 according to the present invention includes: an optical waveguide 2; a core 3 in the optical waveguide 2; an angled cut face 4 in the core 3; an adhesive layer 5 formed on the angled cut face 4 and having approximately the same refractive index as that of the core 3; and a metal film 6 formed on the adhesive layer 5 by transfer (see FIG. 1(e)). The optical waveguide 2 of the mirror-embedded-optical-waveguide 1 includes an underclad 8, the core 3 and an overclad 7 which are extending in parallel with one laid atop another.

In fabrication of the mirror-embedded-optical-waveguide 1, the metal film 6 is formed by transfer using a metal-layer-transferring-jig 9 provided separately from the optical waveguide 2. Specifically, the metal film 6 is formed on the angled cut face 4 by: vapor depositing a metal 10 onto the metal-layer-transferring-jig 9; applying, to the angled cut face 4 of the core 3, an adhesive 13 having approximately the same refractive index as that of the core 3; and transferring the metal 10 deposited on the metal-layer-transferring-jig 9 onto the adhesive-applied angled cut face 4 by forcing the jig 9 against the face 4.

FIGS. 1(a) to 1(f) are schematic illustrations showing cross-sectional views of fabrication steps for a mirror embedded optical waveguide according to the present invention. More specifically, as shown in FIG. 1(a), the optical waveguide 2 composed of the underclad 8, core 3 and overclad 7 is firstly fabricated. Exemplary types of the optical waveguide 2 include, as well as single-mode optical waveguides, multi-mode optical waveguides which are expected to provide low cost because of their ease of connection or other reasons.

The optical waveguide 2 is preferably a polymer optical waveguide. Polymer optical waveguides are deformable. Therefore, when the metal-layer-transferring-jig 9 is fitted into a mirror groove 12 formed in the optical waveguide 2 (as will be described later), the mirror groove 12 deforms and absorbs any minute shape difference between the jig 9 and groove 12, thereby enabling a smooth fit. For example, even when the mirror groove 12 is designed in an accurate concave V-shape, its surface can have protrusions due to roughness or its bottommost portion can be microscopically rounded due to machining error. In such a situation, for example, the topmost portion of the convex V-shape of the metal-layer-transferring-jig 9 can touch the rounded portion, thus hindering close fit between the two faying surfaces. Deformation of the mirror groove 12 alleviates such a problem and allows for close (smooth) fit between the two surfaces.

There is no limitation on the material of the polymer optical waveguide; for example, there can be used rubbers such as silica ketone (polysiloxane) rubbers and acrylic rubbers, or resins such as acrylic resins, epoxy resins, silica ketone (polysiloxane) resins and polyimide resins. The polymer optical waveguide 2 may be of a film type without a substrate, or of a rigid type with a substrate (not shown). Examples of the substrate material include, but are not necessarily limited to, quartz and silicon.

As shown in FIG. 1(b), the mirror groove 12 is formed in the optical waveguide 2 by dicing or the like. The mirror groove 12 is, for example, a V-groove having side walls angled 45° with respect to the longitudinal direction of the core 3. The mirror groove 12 may be formed by dicing, molding or laser machining. Of these, dicing with a dicing blade having opposite side faces angled 45° with respect to the optical axis of a photonic device is advantageous, because multiple optical waveguides 2 placed in the dicing direction can be readily batch fabricated in a short time frame.

The shape of the mirror groove 12 is not limited to a V-shape, but any shape such as a trapezoid can be employed as long as it provides the angled cut face 4. One additional point to be noted is that the topmost portion of the metal-layer-transferring-jig 9 can have a chipped or rounded portion of the order of 10 to 20 μm due to chipping or the like. Therefore, the mirror groove 12 is preferably formed approximately 20 μm deeper than the bottom of the core 3 (the border with the underclad 8) to prevent the chipped or rounded topmost portion of the jig 9 from contacting the core 3. That is, the mirror groove 12 is formed to extend from the overclad 7 through the core 3 into the underclad 8, thereby providing an angled cut face 4 punching through the core 3. Here, the depth of the mirror groove 12 is not particularly limited as long as it does not punch through the underclad 8. Considering dicing accuracy, the distance between the bottom surface of the underclad 8 (the mounting surface for a photonic device) and the bottommost portion of the mirror groove 12 is preferably 10 μm or more.

As shown in FIG. 1(c), an adhesive 13 is then dropped into the mirror groove 12 in a suitable amount. This causes the adhesive 13 to adhere to the entire surface of the angled cut face 4. There is no limitation on the type of the adhesive 13, and there can be used various types of adhesives such as acrylic adhesives, epoxy adhesives, silica ketone (polysiloxane) adhesives. However, it is required that the adhesive 13 used have good adhesiveness to both the optical waveguide 2 and metal film 6, do not contain light scatterers such as fillers, be transparent and have high transmissivity to light of wavelengths used. Additionally, the adhesive 13 preferably has approximately the same refractive indices as those of the core 13.

When using a UV-curable adhesive as the adhesive 13, the adhesive 13 needs to be cured by UV irradiation through the bottom surface of the underclad 8, because UV irradiation through the top surface of the overclad 7 will be blocked by the metal film 6 and will not reach the adhesive 13. Therefore, the underclad 8 is required to transmit UV light. When the underclad 8 has a substrate formed thereunder, such a substrate is also required to transmit UV light. In addition, when using a UV light-blocking material such as silicon and polyimide (which strongly absorbs UV light) for the substrate of the optical waveguide, a thermosetting adhesive can be used instead of such a UV-curable adhesive.

The metal-layer-transferring-jig 9 is provided separately from the optical waveguide 2. As shown in FIG. 1(d), the metal-layer-transferring-jig 9 is formed in a complementary convex V-shape so that it can fit into the mirror groove 12. Specifically, a square column of silicon is used for the metal-layer-transferring-jig 9. And, the jig 9 is held with a diagonal thereof being in parallel to the longitudinal direction of the optical waveguide 2 so that, when it is fitted into the mirror groove 12, the topmost portion thereof contacts the bottommost portion of the mirror groove 12.

When transferring the metal, the metal-layer-transferring-jig 9 is fitted in a pressing jig 14 having a complementary V-shape groove, which are then pressed together against the mirror groove 12. In order to prevent deformation of the flat surfaces of the metal-layer-transferring-jig 9 during the pressing operation, the modulus of elasticity of the jig 9 is preferably sufficiently higher than that of the optical waveguide 2 (1 MPa to 10 GPa). Exemplary materials having such a high modulus of elasticity include silicon, quartz and soda-lime glass. When a rubber with a modulus of elasticity of 1 to 10 MPa is used for the optical waveguide 2, materials with a modulus of elasticity of 1 to 10 GPa (e.g., resin) can be employed for the metal-layer-transferring-jig 9.

Then, the metal 10 is vapor deposited onto the metal-layer-transferring-jig 9. As the metal 10, there can be used gold, aluminum, silver, etc. Of these, gold is advantageous because it has a high reflectivity and excellent corrosion resistance, and also provides good release properties from the metal-layer-transferring-jig 9 thus eliminating the need of any release layer. When a metal with poor release properties from the metal-layer-transferring-jig 9 is used, it is preferred to vapor deposit the metal onto a release layer (not shown) provided on the surface of the jig 9. The release layer is made of a release agent such as fluorine-based materials.

Then, the metal-layer-transferring-jig 9 is fitted into the mirror groove 12 by pressing the pressing jig 14 against the optical waveguide 2. This causes the metal 10 on the metal-layer-transferring-jig 9 to contact the adhesive 13. Subsequently, the adhesive 13 is cured while holding the jig 9 in place.

As shown in FIG. 1(e), after the adhesive 13 has been cured and the adhesive layer 5 has been formed, the metal-layer-transferring-jig 9 is removed from the mirror groove 12. Thereby, the metal 10 can be left on the optical waveguide 2 after having adhered to the adhesive 13 and detached from the jig 9. That is, the metal 10 has been transferred to the angled cut face 4 to form the metal film 6.

As shown in FIG. 1(f), it is preferable to protect the mirror groove 12 after the metal film 6 has been formed by the transfer. The protection can be done by dropping an adhesive (not shown) into the mirror groove 12 and covering the top opening of the mirror groove 12 with a reinforcing plate 15.

When using a film-type optical waveguide, such protection and reinforcement is indispensable because the portion providing the mirror groove 12 is formed extremely thin and is therefore weak in strength. The adhesive as used here is not particularly limited in type, and it does not require transparency unlike the aforementioned adhesive 13.

Figure 2:
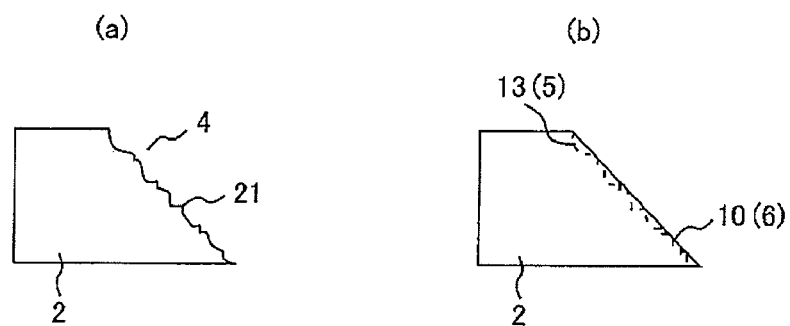
FIGS. 2(a) and 2(b) are schematic illustrations showing enlarged views of an angled cut face, 2(a) before applying an adhesive to the angled cut face; and 2(b) after applying the adhesive to the angled cut face.

According to the present invention, the angled cut face 4 formed in the core 3 of the optical waveguide 2 has the adhesive layer 5 with approximately the same refractive index as that of the core 3 and the metal film 6 is formed on this adhesive layer 5 by transfer. FIGS. 2(a) and 2(b) are schematic illustrations showing enlarged views of an angled cut face, 2(a) before applying an adhesive to the angled cut face; and 2(b) after applying the adhesive to the angled cut face. Therefore, a surface roughness 21 (FIG. 2(a)) caused by dicing is filled with the adhesive 13 as shown in FIG. 2(b), thereby smoothing the interface between the adhesive 13 and metal 10 (between the adhesive layer 5 and metal film 6). As a result, light reflection loss (mirror loss) can be reduced. That is, since the refractive index difference between the core 3 and adhesive 13 is small, light scattering at the interface between the rough surface of the angled cut face 4 and adhesive layer 5 can be reduced, thus leading to reduction in light reflection loss (mirror loss). Also, the surface of the metal-layer-transferring-jig 9 contacting the angled cut face 4 of the core 3 preferably has an arithmetic average roughness Ra of 0.05 μm or less in order to reduce light scattering contributed by the surface roughness of the metal film 6.

Although the mirror-embedded-optical-waveguide 1 of this embodiment employs the metal film 6, a multi-layer film may be used instead. Thus, the present invention offers an additional advantage because a multi-layer film can be formed on a 45°-micro-mirror embedded in a waveguide, which conventional arts have had difficulty in providing because of thickness control problem. Here, it is preferable to provide a release layer onto the metal-layer-transferring-jig 9.

The following method can be used instead of vapor depositing the metal 10 onto the metal-layer-transferring-jig 9. Firstly, there is provided a female-type-transferring-jig having a V-groove of the same shape as that of the mirror groove 12 formed in the optical waveguide 2, and a metal is vapor deposited onto the V-groove of the female jig. Then, a resin is applied to the female-type-transferring-jig and cured, thereby forming a male-type-transferring-jig having a complementary V-shape convex. The male-type-transferring-jig is then released from the female-type-transferring-jig while urging the metal to be attached to the complementary V-shape convex of the male jig. Then, the male-type-transferring-jig is pressed against the mirror groove 12 of the optical waveguide 2. In this manner, the metal film 6 can be transferred onto the adhesive layer 5 formed on the angled cut face 4. It should also be added that the aforementioned vapor deposition of the metal 10 may be performed onto both side faces of the metal-layer-transferring-jig 9, or only the one side face thereof needed for the transfer, or the entire faces thereof.

EXAMPLES

The present invention will be described below with reference to, but not limited to, the following examples.

Example 1

At first, in order to fabricate a mirror groove, a V-groove having cut faces angled 45° with respect to the axis of a photonic device was formed in an epoxy-based polymer optical waveguide [refractive index: 1.57 (core); 1.51 (clad)]

using a dicing blade with two cutting faces forming a 90° angle. The structure of the epoxy-based polymer optical waveguide was as follows: core thickness 50 μm, underclad thickness 50 μm, overclad thickness 20 μm, without substrate.

Then, a metal-layer-transferring-jig was fabricated using a square column of silicon with smooth surfaces having a roughness Ra of 0.02 μm or less. Subsequently, a 0.3-μm-thick gold layer was vapor deposited onto the jig. Next, onto the core area of the mirror groove, there was dropped, with a dispenser, a thermosetting epoxy-based adhesive having the same refractive index as that of the core (1.57). Then, the metal-layer-transferring-jig was fitted into the mirror groove so that its gold deposited surface contacted the core. Subsequently, the jig was forced against the mirror groove at a stress of 1 kgf/2 mm² (0.5 kgf/mm²) while curing the adhesive by heating at 120° C. for 15 min. After the adhesive had been cured, the metal-layer-transferring-jig was removed from the mirror groove. Finally, a reinforcing plate was fixed to the polymer optical waveguide so as to cover the mirror groove, thereby completing fabrication of a mirror-embedded-optical-waveguide as Example 1.

Figure 3A:
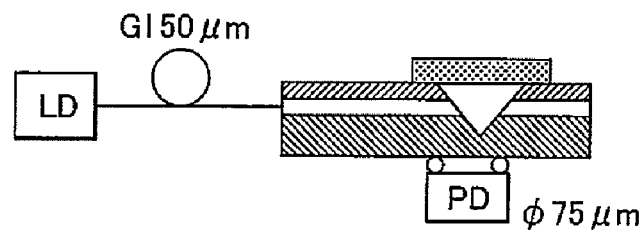
FIG. 3A is a schematic illustration showing a method of measuring the mirror loss of a mirror embedded optical waveguide.

A method of measuring the light reflection loss (mirror loss) of the mirror-embedded-optical-waveguide of examples will now be described with reference to FIG. 3A. FIG. 3A is a schematic illustration showing a method of measuring the light reflection loss (mirror loss) of a mirror-embedded-optical-waveguide. As shown in FIG. 3A, light from a 850-nm-wavelength laser diode (LD) source was directed to be incident on the mirror-embedded-optical-waveguide through a 50 μm graded-index (GI) optical fiber. A matching oil was used for connection. Light reflected from the mirror of the waveguide was received by a 75-μm-diameter photodiode (PD) and was measured for the intensity $I_1$. In addition to the above measurement, light outputted directly from the 50 μm graded-index (GI) optical fiber was received by the photodiode (PD) and was measured for the intensity $I_0$. And, the overall loss $L_A$ of the waveguide was determined from the below equation (1) using the $I_0$ value as the denominator. As expressed in the below equation (2), the mirror loss $L_M$ was determined by subtracting from the $L_A$ value the transmission loss $L_P$ and the Fresnel reflection loss $L_F$ due to the refractive index difference between the underclad and air.

$$L_A = -10 \times \mathrm{Log}(I_1/I_0) \quad (1)$$

$$L_M = L_A - L_P - L_F \quad (2)$$

Figure 3B:
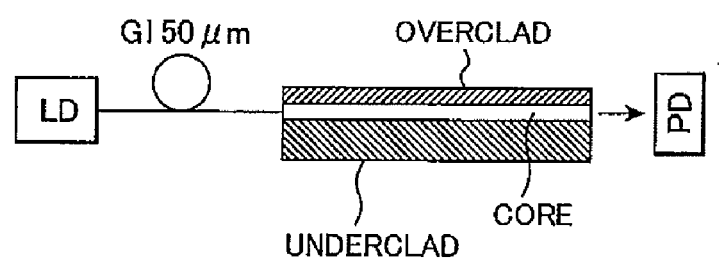
FIG. 3B is a schematic illustration showing a method of measuring the transmission loss of an optical waveguide without a mirror groove.
Figure 4:
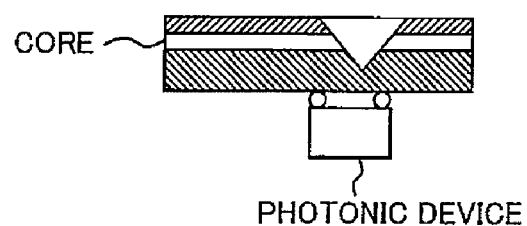
FIG. 4 is a schematic illustration showing a cross-sectional view of a conventional optical waveguide having a photonic device mounted thereon.

Next, a method of measuring the transmission loss of the optical waveguide, $L_P$, is described by reference to FIG. 3B. FIG. 3B is a schematic illustration showing a method of measuring the transmission loss of an optical waveguide without a mirror groove. As shown in FIG. 3B, a 50 μm GI optical fiber was optically connected to one end of the optical waveguide without the mirror groove, and to the other end thereof was optically connected a photodiode (PD) for receiving light outputted from the waveguide. Let $I_2$ denote the light intensity received by the PD, then the transmission loss of the optical waveguide is calculated from the following equation.

$$L_P = -10 \times \mathrm{Log}(I_2/I_0)$$

The result of the measurement was that the light reflection loss (mirror loss) of the mirror-embedded-optical-waveguide of Example 1 was as low as 0.5 dB. In addition, there was observed no degradation in the light reflection loss (mirror loss) even after a high-temperature-and-high-humidity test (85° C. and 85% RH for 1,000 h) and after a thermal shock test (from −40° C. to 85° C., 500 cycles).

Comparative Example 1

Further, in order to fabricate a comparative example mirror groove, a V-groove having cut faces angled 45° with respect to the axis of a photonic device was formed in an epoxy-based polymer optical waveguide [refractive index: 1.57 (core); 1.51 (clad)] using a dicing blade with two cutting faces forming a 90° angle. Gold was vapor deposited directly onto the mirror groove and a reinforcing plate was fixed to the polymer optical waveguide so as to cover the mirror groove. In this manner, a mirror-embedded-optical-waveguide of a conventional structure (Comparative example 1) was fabricated.

The light reflection loss (mirror loss) of the mirror-embedded-optical-waveguide as Comparative example 1 was 1.0 dB. And, there was observed some peeling of the gold film after a high-temperature-and-high-humidity test (85° C. and 85% RH for 1,000 h) and after a thermal shock test (from −40° C. to 85° C., 500 cycles).

Example 2

Another mirror-embedded-optical-waveguide as Example 2 was fabricated. In Example 2, a thermosetting epoxy-based adhesive having the refractive index of 1.52 was used, which was approximately the same refractive index as that of the core (1.57). The other fabrication conditions as well as the measurement were the same as those of Example 1.

The result of the measurement was that the light reflection loss (mirror loss) of Example 2 was as low as 0.7 dB, which was almost the same level in Example 1. In addition, there was observed no degradation in the light reflection loss (mirror loss) even after the high-temperature-and-high-humidity test (85° C. and 85% RH for 1,000 h) and after the thermal shock test (from −40° C. to 85° C., 500 cycles).

Example 3

Another mirror-embedded-optical-waveguide as Example 3 was fabricated. In Example 3, a thermosetting epoxy-based adhesive having the refractive index of 1.60 was used, which was approximately the same refractive index as that of the core (1.57). The other fabrication conditions as well as the measurement were the same as those of Example 1.

The result of the measurement was that the light reflection loss (mirror loss) of Example 3 was as low as 0.6 dB, which was almost the same level in Example 1. In addition, there was also observed no degradation in the light reflection loss (mirror loss) even after the high-temperature-and-high-humidity test (85° C. and 85% RH for 1,000 h) and after the thermal shock test (from −40° C. to 85° C., 500 cycles).

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A mirror embedded polymer optical waveguide, comprising:
   a core;
   an overclad covering the core;
   an underclad lying under the core;
   an angled cut face configured to be a mirror groove from the overclad through the core into the underclad, a bottommost portion of the angled cut face being positioned approximately 20 μm deeper than a bottom of the core, 10 μm or more being a distance between the bottommost portion of the angled cut face and a bottom surface of the underclad, the angled cut face having a surface roughness with projections and depressions;

an adhesive layer formed on the angled cut face with which the depressions of the surface roughness of the angled cut face are filled, the adhesive layer having approximately the same refractive index as that of the core;

a metal film formed on the adhesive layer, the metal film being formed by transfer and in contact with the projections of the surface roughness of the angled cut face to be the mirror;

another adhesive formed in the mirror groove and on the metal film; and a reinforcing plate covering a top opening of the mirror groove.

2. A fabrication method for a mirror embedded polymer optical waveguide comprising: a core; an overclad covering the core; an underclad lying under the core; an angled cut face from the overclad through the core into the underclad; and a metal film formed on the angled cut face, the fabrication method comprising steps of:

providing the angled cut face configured to be a mirror groove by cutting from the overclad through the core into the underclad by means of a dicing blade such that a bottommost portion of the angled cut face is positioned approximately 20 µm deeper than a bottom of the core and that 10 µm or more is a distance between the bottommost portion of the angled cut face and a bottom surface of the underclad, thereby the angled cut face having a surface roughness with projections and depressions;

applying an adhesive to the angled cut face in an amount to fill the depressions of the surface roughness of the angled cut face with the adhesive, the adhesive having approximately the same refractive index as that of the core;

preparing a metal-film-transferring-jig in a shape fittable into the mirror groove, the metal-film-transferring-jig having an average surface roughness of 0.05 µm or less;

vapor depositing a metal onto the metal-film-transferring-jig; and transferring the metal onto the angled cut face in order to form a metal film, the transferring being conducted by forcing the metal formed on the metal-film-transferring-jig against the adhesive-applied angled cut face so that the adhesive fills the depressions of the surface roughness of the angled cut face, so that a smooth interface is formed between the adhesive and the metal film, and that the metal film is contacted with the projections of the surface roughness of the angled cut face to be the mirror, by curing the adhesive, and then by removing the metal-film-transferring-jig from the mirror groove;

subsequently, dropping another adhesive into the mirror groove and on the metal film; and covering a top opening of the mirror groove with a reinforcing plate.

3. A fabrication method for a mirror embedded polymer optical waveguide comprising: a core; an overclad covering the core; an underclad lying under the core; an angled cut face from the overclad through the core into the underclad; and a metal film on the angled cut face, the fabrication method comprising steps of:

providing the angled cut face by cutting from the overclad through the core into the underclad by means of a dicing blade such that a bottommost portion of the angled cut face is positioned approximately 20 µm deeper than a bottom of the core and the 10 µm or more is a distance between the bottommost portion of the angled cut face and a bottom surface of the underclad, thereby forming a mirror groove with a rough surface having projections and depressions;

applying an adhesive to the angled cut face by dropping the adhesive in the mirror groove in an amount to fill the depressions of the rough surface of the angled cut face with the adhesive, the adhesive having approximately the same refractive index as that of the core;

forming a metal-film-transferring-jig in a shape fittable into the mirror groove, the metal-film-transferring-jig having an average surface roughness of 0.05 µm and having, on its surface, a release layer of a release agent;

vapor depositing a metal onto the release layer;

fitting the metal-film-transferring-jig into the mirror groove;

transferring the metal onto the angled cut face in order to form a metal film thereon, the transferring step including:

forcing the metal-deposited metal-film-transferring-jig against the adhesive-applied angled cut face so that the adhesive fills the depressions of the surface roughness of the angled cut face, so that a smooth interface is formed between the adhesive and the metal film, and that the metal film is in contact with the projections of the surface roughness of the angled cut face to be the mirror;

curing the adhesive; and removing the metal-film-transferring-jig from the mirror groove;

subsequently, dropping another adhesive into the mirror groove and on the metal film; and covering a top opening of the mirror groove with a reinforcing plate.

* * * * *